United States Patent
Toth

[11] 3,902,171
[45] Aug. 26, 1975

[54] ACCUMULATOR RADAR ECHO DETECTOR

[75] Inventor: Peter Toth, Kloten, Switzerland

[73] Assignee: Contraves AG, Zurich, Switzerland

[22] Filed: Oct. 1, 1973

[21] Appl. No.: 402,186

[30] Foreign Application Priority Data
Oct. 12, 1972 Switzerland.................. 14950/72

[52] U.S. Cl. .............................................. 343/5 DP
[51] Int. Cl.² ........................................... G01S 9/02
[58] Field of Search ................................. 343/5 DP

[56] References Cited
UNITED STATES PATENTS

| | | | |
|---|---|---|---|
| 3,325,806 | 6/1967 | Wilmot et al. | 343/5 DP |
| 3,353,177 | 11/1967 | Wilmot | 343/5 DP |
| 3,399,404 | 8/1968 | Githens et al. | 343/5 DP |
| 3,412,397 | 11/1968 | Evans | 343/5 DP |
| 3,680,088 | 7/1972 | Bryant et al. | 343/5 DP |
| 3,680,095 | 7/1972 | Evans | 343/5 DP |
| 3,797,014 | 3/1974 | Tompkins et al. | 343/5 DP |

*Primary Examiner*—Maynard R. Wilbur
*Assistant Examiner*—G. E. Montone
*Attorney, Agent, or Firm*—Werner W. Kleeman

[57] ABSTRACT

An accumulator radar echo detector for generating continuous target indication signals at associated range rings of a PPI-radar screen, wherein a numerical accumulation device and associated decision logic are combined into a fixed programmed assignment storage i.e. read only memory (ROM) which, in accordance with a predetermined assignment table for each possible total condition combination at its input, generates a respective predetermined total condition combination at its output.

2 Claims, 3 Drawing Figures

3,902,171

ACCUMULATOR RADAR ECHO DETECTOR

BACKGROUND OF THE INVENTION

The present invention relates to a new and improved construction of accumulator radar echo detector for generating continuous target indicator signals at associated distance range rings of a PPI-radar screen and for suppressing disturbance echo pulses and supplementing momentary received gaps.

In the publications referred to hereinafter there are described by way of example such type radar echo detectors. They encompass a quantization device for the transformation or conversion of input pulses exceeding a reference peak into impact signals prolonged by a predetermined duration, a numerical accumulation device which, as a function of whether or not a stored summation value is supplemented by an impact signal, increases the stored summation value by a number of units or reduces such by a unit, there also being provided an associated decision logic which upon exceeding a predetermined minimum summation value produces a target presence signal and with subsequent falling below of such minimum summation value resets the stored summation value to the starting value null.

The publications which are relevant in this respect are the following:

F. Marcoz and G. Galati: "A Suboptimal Detection Technique: The Accumulator Detector" in (ALTA FREQUENZA (Bd. 41, No. 2, Geb. 72 pages 77–89)

Irving J. Gabelmann: "Techniques For Data Handling In Tactical Systems" pages 132–146 (Rome Air Development Center, Griffis Air Force Base, New York 7. Nov. 1968)

According to both such publications there are delivered from a storage to a forwards-backwards counter previously obtained summation values and the possibly present or not present quantized impact signals, whereby the previous summation values are increased by a number of units or reduced by a unit and the thus attained new counter state is delivered to a decision logic which, after exceeding a predetermined minimum counter state, serves to indicate the presence of a target object by a signal and to bring about the storage of the attained counter state up to a maximum value and during a successive falling below of a minimum value indicating the absence of a target object and storing the summation value null, and wherein also there can be generated target start signals and target end or termination signals.

SUMMARY OF THE INVENTION

It is a primary object of the present invention to provide an improved construction of accumulator radar echo detector.

Another and more specific object of the present invention aims at combining the required forwards-backwards counter with its relatively expensive function control and associated decision logic into a single, relatively inexpensive and light structural unit which can be fixedly programmed easily according to the desired accumulation principle and thus to structurally simplify and render more operationally reliable the accumulator radar echo detector in contrast to state-of-the-art devices.

Now in order to implement these and still further objects of the invention, which will become more readily apparent as the description proceeds, the invention proposes that the numerical accumulation device and associated decision logic be united or combined into a fixed programmed assignment storage which in accordance with a predetermined assignment table for each possible total condition combinations at its input produces a respective predetermined total condition combination at its output.

In consideration of French Pat. No. 1,535,322 of Texas Instruments, Inc., USA, which however describes and discloses a different type of accumulator radar echo detector, there is advantageously provided for the detector of this development as the storage element a shift register constructed such that each partial condition combination which is supplied from the output of the assignment storage to its input, under the action of periodically infed shift signals is fed back to the input of the assignment storage as previously attained summation value via a predetermined multiplicity of shift stages. Further, through the agency of an additional input terminal of the assignment storage the quantized impact signals from the input pulse-quantization device are fed-in for the possible supplementing or amplification of the earlier summation value and from the total condition combination which exists at the output of the assignment storage there is transmitted a partial combination to the input of the shift register and the remaining combination to an evaluation device.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
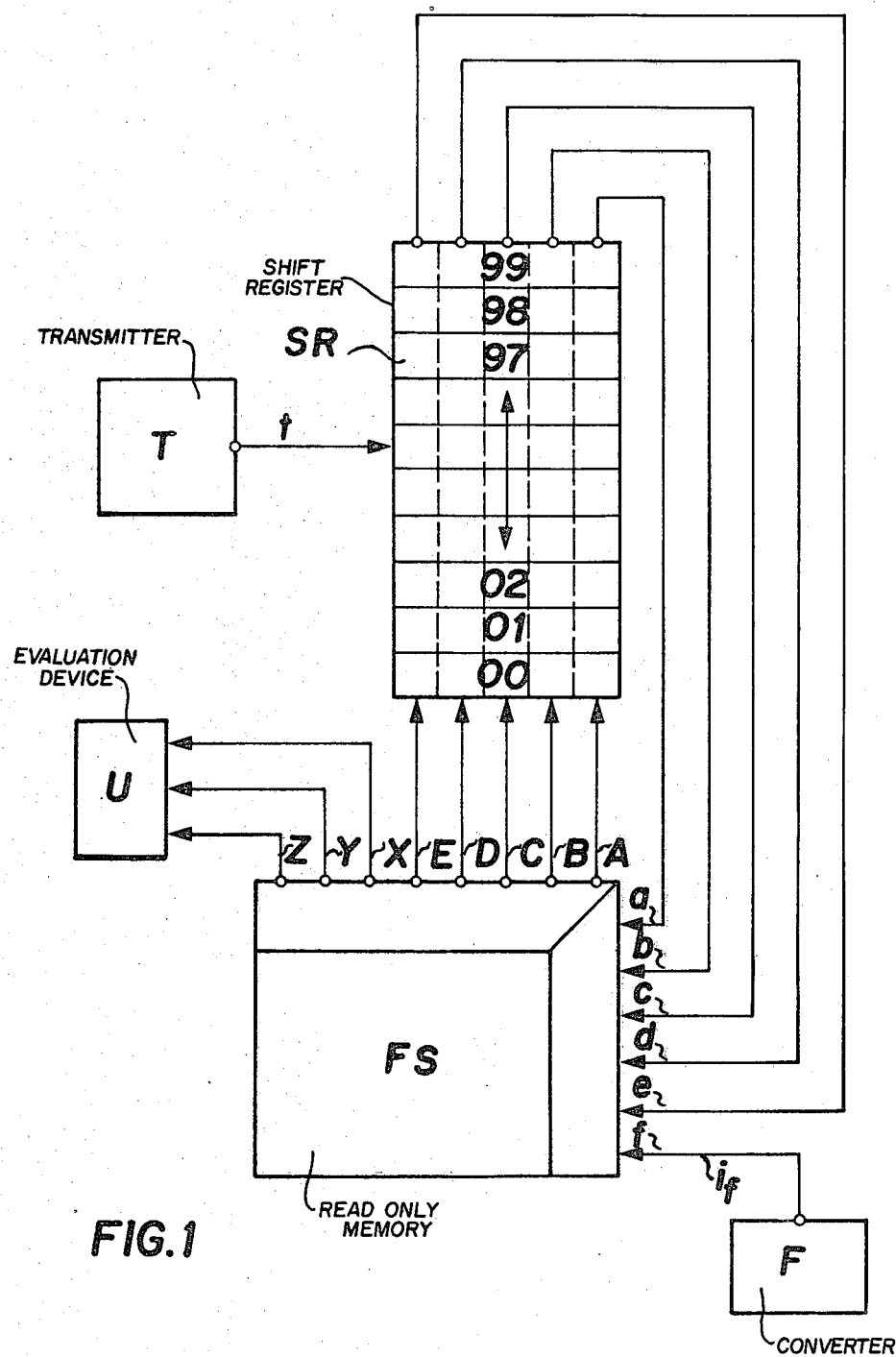
FIG. 1 is a block circuit diagram of an accumulator radar echo detector designed according to the teachings of the invention.

Describing now the drawings, in the block circuit diagram of FIG. 1 there is designated by reference character SR a 5-bit-shift register which encompasses 100 storage stages 00, 01, 02 . . . 97, 98, 99. Under the action of shift pulses $t$ which are delivered to the shift register from a timing signal generator or transmitter T, for instance with the frequency $10^6$, there is transmitted a 5-bit-condition combination which is introduced to the input storage stage 00 via each shift signal $t$ stepwise to the relevant next following storage stage, so that each condition combination which is transmitted at the time $\tau_o$ to the input storage stage 00 arrives at the time $\tau_o + 100 \cdot 10^{-6}$ seconds at the output storage stage 99.

Each condition combination arriving at the output storage stage 99 of the shift register SR is transmitted to the associated inputs $a$, $b$, $c$, $d$, $e$ of a fixed programmed assignment or allocation storage FS. Such assignment storages are known to the art and commonly referred to as read only memory (ROM) and commercially available. For instance, there can be commercially obtained a read only memory having a storage capacity of 64 words at 8-bits, with a 6-bit input and an 8-bit output which is available on the market under the designation HARRIS-HPROM-0512 (Read only memory) and can be fixedly programmed in a most simple manner according to a desired assignment table. The sixth input $f$ to the read only memory FS is connected with a quantizing echo signal converter or transformer F of a radar device, which at a fixed frequency sequence transmits transmission pulses and transforms all echo pulses which arrive between two successive shift signals $t$ into a prolonged impact signal $i_f$ to the input $f$ provided they exceed a minimum peak. It is to be observed that the echo pulses arrive between two successive transmission pulses with more or less large timedelay, which is dependent upon the distance to the echo generating object or target. It is therefore possible, between two respective successive transmission pulses to generate 100 shift signals $t$ for the shift register SR (transmission pulse frequency: $10^4$ Hz, shift pulse frequency $10^6$ Hz). In the event that a radar transmission pulse impacts against an object or target 0 at a distance or range $q.150$m to $(q+1).150$m, the corresponding echo signal $f$ arrives at the time range $(\tau_s+q.10^{-6}$ sec) to $(\tau_s+(q+1).10^{-6}$ sec) and wherein $\tau_s$ equals the transmission time of a transmitted pulse, $00 \leq q \leq 99$).

The read only memory FS is to be preprogrammed such that for each total 6-bit condition combination $a$, $b$, $c$, $d$, $e$, $f$ at the input there is generated at the 8-bit output an associated total condition combination A, B, C, D, E, X, Y, Z.

The input binary conditions or states have the following significance:

$$a = 2^0 \quad b = 2^1 \quad c = 2^2 \quad d = 2^3 \quad e = 2^4$$
$$\overline{a} = 0 \quad \overline{b} = 0 \quad \overline{c} = 0 \quad \overline{d} = 0 \quad \overline{e} = 0$$
$$f = \text{impact signal} = 2^5 = 32$$
$$\overline{f} = \text{no impact signal} = 0$$

The output binary conditions or states have the following significance:

$$A = 2^0 \quad B = 2^1 \quad C = 2^2 \quad D = 2^3 \quad E = 2^4$$
$$\overline{A} = 0 \quad \overline{B} = 0 \quad \overline{C} = 0 \quad \overline{D} = 0 \quad \overline{E} = 0$$

X = presence of accumulated target echo
$\overline{X}$ = absence of accumulated target object
Y = beginning of an accumulated target echo
Z = target echo-termination or end of an accumulated target echo It is contemplated that each partial condition combination from the last storage stage 99 of the shift register SR delivered to the inputs $a$, $b$, $c$, $d$, $e$, and which have associated therewith a time value $\tau-100~\mu$ sec, are increased by the decimal value $32=2^5$, if since the last shift signal $t$ there has been generated an impact signal $f$ at the corresponding phase region, and that this does not occur when since the last shift signal $t$ there is not produced any impact signal $f$ in the corresponding phase region. Accordingly the total 6-bit input condition combinations could have each binary coded value in the range of 0 to 63.

The hereinafter given Table portrays a possible example for allocation or assignment of the total 8-bit output-condition combinations A, B, C, D, E, X, Y, Z to the possible input-condition combinations $a$, $b$, $c$, $d$, $e$, $f$. The partial condition combinations A, B, C, D, E are thus always immediately transmitted to the input storage stage 00 of the shift register SR and again depart from the storage stage 99 of the shift register SR after a period of 100 shift signals $t$ as "earlier storage content" to the inputs $a$, $b$, $c$, $d$, $e$ of the fixed storage FS.

| Old Summation Value decade a b c d e | Echo f | Total Input | New Summation Value decade A B C D E | Equivalent New Summation | Evaluation Signals X Y Z |
|---|---|---|---|---|---|
| 0 | φ | 0 | 0 | 0 | φ φ φ |
| 1 | φ | 1 | 0 | 0 | φ φ φ |
| 2 | φ | 2 | 1 | 1 | φ φ φ |
| 3 | φ | 3 | 2 | 2 | φ φ φ |
| 4 | φ | 4 | 3 | 3 | φ φ φ |
| 5 | φ | 5 | 4 | 4 | φ φ φ |
| 6 | φ | 6 | 5 | 5 | φ φ φ |
| 7 | φ | 7 | 6 | 6 | φ φ φ |
| 8 | φ | 8 | 7 | 7 | φ φ φ |
| 9 | φ | 9 | 8 | 8 | φ φ φ |
| 10 | φ | 10 | 9 | 9 | φ φ φ |
| 11 | φ | 11 | 10 | 10 | φ φ φ |
| 12 | φ | 12 | 11 | 11 | φ φ φ |
| 13 | φ | 13 | 12 | 12 | φ φ φ |
| 14 | φ | 14 | 13 | 13 | φ φ φ |
| 15 | φ | 15 | 14 | 14 | φ φ φ |
| 16 | φ | 16 | 15 | 15 | 1 φ φ |
| 17 | φ | 17 | 18 | 17–1 | 1 φ φ |
| 18 | φ | 18 | 19 | 17–2 | 1 φ φ |
| 19 | φ | 19 | 20 | 17–3 | 1 φ φ |
| 20 | φ | 20 | 21 | 17–4 | 1 φ φ |
| 21 | φ | 21 | 00 | 17–5 | φ φ 1 |
| 22 | φ | 22 | 0 | 0 | φ φ φ |
| 23 | φ | 23 | 0 | 0 | φ φ φ |
| 24 | φ | 24 | 0 | 0 | φ φ φ |
| 25 | φ | 25 | 0 | 0 | φ φ φ |
| 26 | φ | 26 | 0 | 0 | φ φ φ |
| 27 | φ | 27 | 0 | 0 | φ φ φ |
| 28 | φ | 28 | 0 | 0 | φ φ φ |
| 29 | φ | 29 | 0 | 0 | φ φ φ |
| 30 | φ | 30 | 0 | 0 | φ φ φ |
| 31 | φ | 31 | 0 | 0 | φ φ φ |

| Old Summation Value decade a b c d e | Echo f | Total Input | New Summation Value decade A B C D E | Equivalent New Summation Value | Evaluation Signals X Y Z |
|---|---|---|---|---|---|
| 0 | 32 | 32 | 3 | 3 | φ φ φ |
| 1 | 32 | 33 | 4 | 4 | φ φ φ |
| 2 | 32 | 34 | 5 | 5 | φ φ φ |
| 3 | 32 | 35 | 6 | 6 | φ φ φ |
| 4 | 32 | 36 | 7 | 7 | φ φ φ |
| 5 | 32 | 37 | 8 | 8 | φ φ φ |
| 6 | 32 | 38 | 9 | 9 | φ φ φ |
| 7 | 32 | 39 | 10 | 10 | φ φ φ |
| 8 | 32 | 40 | 11 | 11 | φ φ φ |
| 9 | 32 | 41 | 12 | 12 | φ φ φ |
| 10 | 32 | 42 | 13 | 13 | φ φ φ |
| 11 | 32 | 43 | 14 | 14 | φ φ φ |
| 12 | 32 | 44 | 15 | 15 | φ φ φ |
| 13 | 32 | 45 | 16 | 16 | φ φ φ |
| 14 | 32 | 46 | 17 | 17 | 1 1 φ |
| 15 | 32 | 47 | 17 | 17 | 1 φ φ |
| 16 | 32 | 48 | 17 | 17 | 1 φ φ |
| 17 | 32 | 49 | 17 | 17 | 1 φ φ |
| 18 | 32 | 50 | 17 | 17 | 1 φ φ |
| 19 | 32 | 51 | 17 | 17 | 1 φ φ |
| 20 | 32 | 52 | 17 | 17 | 1 φ φ |
| 21 | 32 | 53 | 18 | 17–1 | 1 φ φ |
| 22 | 32 | 54 | 00 | 00 | φ φ φ |
| 23 | 32 | 55 | 00 | 00 | φ φ φ |
| 24 | 32 | 56 | 00 | 00 | φ φ φ |
| 25 | 32 | 57 | 00 | 00 | φ φ φ |
| 26 | 32 | 58 | 00 | 00 | φ φ φ |
| 27 | 32 | 59 | 00 | 00 | φ φ φ |
| 28 | 32 | 60 | 00 | 00 | φ φ φ |
| 29 | 32 | 61 | 00 | 00 | φ φ φ |
| 30 | 32 | 62 | 00 | 00 | φ φ φ |
| 31 | 32 | 63 | 00 | 00 | φ φ φ |

These Tables are based upon the following laws:

a. When the decade value of the old summation value is increased by an impact signal $f$ by the supplementary value $32=2^5$ (impact signal $f$ present), then the associated old summation value is increased by +3 units (value +3) to the new summation value content.

b. When the decade value of the old summation value is not increased by the supplementary value 32 (no impact signal $f$), then the assoicated old summation value is reduced by a unit (value −1).

c. When the new summation value for the first time has reached the saturation value 17, then there is present a signal X (target echo surely present) and a signal Y (target echo-start generated).

d. When the old summation value amounts to 17 and an impact signal $f$ is also present then the new summation value remains unchanged at the value 17.

e. When the old summation value amounts to 17 and there is not present any impact signal $f$ then there is produced a new summation value which is reduced by a unit 1.

f. When the old summation value amounts to 13 and there is not present any impact signal $f$ then instead of the new value 12 there is generated a new summation value 00.

g. The signal X (accumulated target signal present) remains intact until the new summation value 12 or 00 has been reached and in this case there is also generated the signal (target-end).

h. After the first occurrence of the summation value 17 there is produced upon the absence of the impact signal instead of the summation value 16, 15, 14, 13 the equivalent summation values 18(17-1), 19 (17-2), 20(17-3), 21(17-4).

Figure 2:
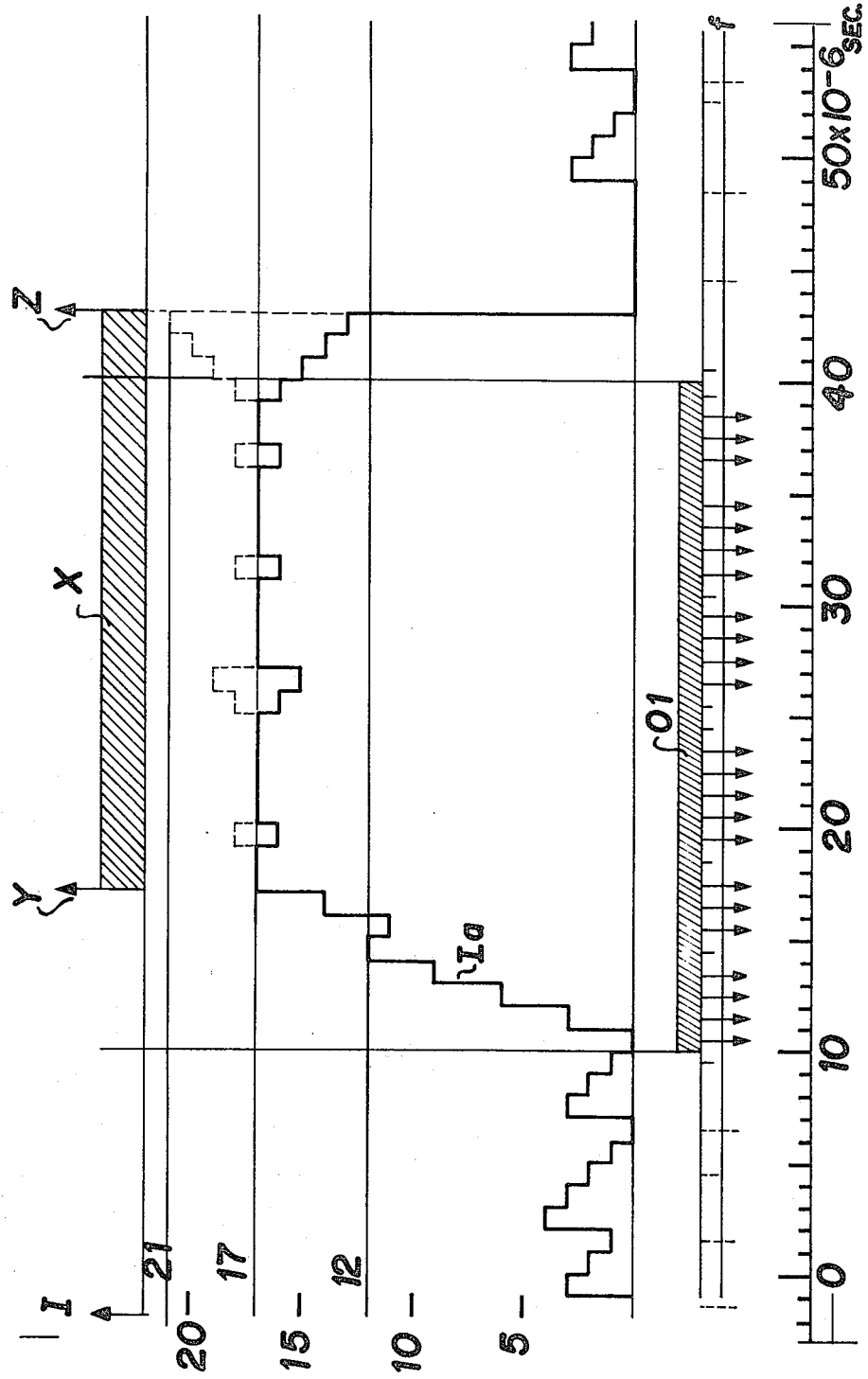
FIG. 2 is a time diagram of a summation value for a predetermined phase- and distance range related to the running period number as argument.

The time diagram or graph according to FIG. 2 corresponds to some predetermined or given distance or range $q.150$m to $(q+1)$ 150m differing from Q(100). As argument there are applicable whole integral multiples of 100 seconds (100 periods of the shift signal $t$) and within each period a respective predetermined one of 100 phase steps. There are plotted over the time scale quantized impact signals $f$ which in each case have been determined since the last shift signal $t$. Therefore such can be disturbance signals or real echo signals. For the purpose of portraying the presence of a real target object 0 in the time 10×100 seconds to 40×100 seconds there has been plotted a square wave signal 0. As shown, it also happens that an echo signal is missing, or only arrives in distorted fashion. Over the argument time scale there is plotted the accumulated new summation value $I_a$ (A, B, C, D, E) as such is always produced at the output of the read only memory FS. On the basis of the preceding Tables there can be read-off the changes. A number of examples will be explained hereinafter.

In the time interval 8/9 there has not been received from the range, which is portrayed by FIG. 2, any echo signal. Thus at the moment 9 the old summation value of the decade value 2 is not supplemented or amplified by an impact signal $f=32$, and there appears the new summation value 01. Further examples are given in the following Table:

| No. | a b c d e | f | a b c d e f | A B C D E | X Y Z |
|---|---|---|---|---|---|
| 10 | 1 | $\phi$ | 1 | 0 | $\phi$ $\phi$ $\phi$ |
| 11 | 0 | 1 | 32 | 3 | $\phi$ $\phi$ $\phi$ |
| 12 | 3 | L | 35 | 6 | $\phi$ $\phi$ $\phi$ |
| 13 | 6 | L | 38 | 9 | $\phi$ $\phi$ $\phi$ |
| 14 | 9 | L | 41 | 12 | $\phi$ $\phi$ $\phi$ |
| 15 | 12 | $\phi$ | 12 | 11 | $\phi$ $\phi$ $\phi$ |
| 16 | 11 | L | 43 | 14 | $\phi$ $\phi$ $\phi$ |
| 17 | 14 | L | 46 | 17 | L L $\phi$ |
| 18 | 17 | L | 49 | 17 | L $\phi$ $\phi$ |
| 19 | 17 | $\phi$ | 17 | (16) 18 | L $\phi$ $\phi$ |
| 20 | 18 | L | 50 | 17 | L $\phi$ $\phi$ |
| 21 | 17 | L | 49 | 17 | L $\phi$ $\phi$ |
| 39 | 17 | $\phi$ | 17 | (16) 18 | L $\phi$ $\phi$ |
| 40 | 18 | $\phi$ | 18 | (15) 19 | L $\phi$ $\phi$ |
| 41 | 19 | $\phi$ | 19 | (14) 20 | L $\phi$ $\phi$ |
| 42 | 20 | $\phi$ | 20 | (13) 21 | L $\phi$ $\phi$ |
| 43 | 21 | $\phi$ | 21 | 00 | $\phi$ $\phi$ L |
| 44 | 00 | $\phi$ | 00 | 00 | $\phi$ $\phi$ $\phi$ |

Accordingly at the time moment 17 there is triggered an accumulated target signal X and a target start signal Y and at the time moment 43 there extinguishes the signal X and there is triggered a target termination signal Z. The signals X, Y, Z are delivered according to the showing of FIG. 1 to an evaluation device U.

It is to be observed that after each shift signal $t$, the previously explained renewal process for the old summation value which is always transferred to the read only memory FS must be carried out.

Figure 3:
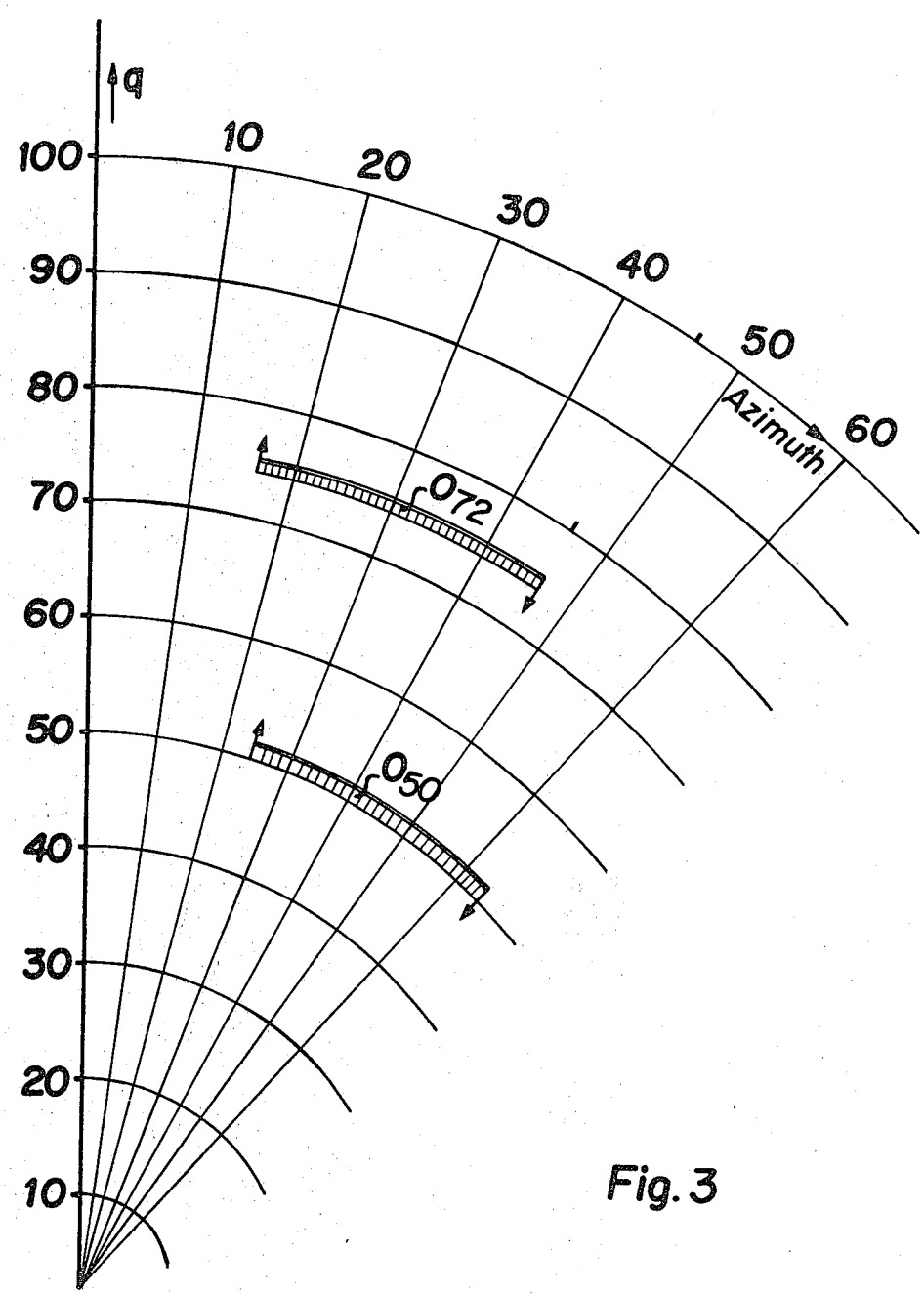
FIG. 3 is a time-expanded sector of a PPI-radar scope or screen with target indication according to range and azimuth.

In FIG. 3 there is portrayed in the form of a time expanded or enlarged PPI-radar screen a radar beam which rotates in the azimuth in the time units $q \times 10^{-6}$ sec. The gapless pulse series $0_{72}$ at the distance or range (72–73).150m (10800m to 10950m) indicates that at this range there is surely determined a target object 072 between the time values 17 and 47. Similarly the pulse sequence $0_{50}$ indicates that at a range 7.5 kilometers–7.65 kilometers between the time values 27 and 63 there was determined a target object.

The assignment laws between the input- and output condition combinations of the read only memory FS and the number and significance of the auxiliary signals (X, Y, Z) are extensively selectable.

While there is shown and described present preferred embodiments of the invention, it is to be distinctly understood that the invention is not limited thereto, but may be otherwise variously embodied and practiced within the scope of the following claims. Accordingly,

What is claimed is:

1. An accumulator radar echo detector for generating continuous target indication signals at associated range rings of a PPI-radar screen comprising a quantizing echo signal converter for transforming each input pulse which exceeds a reference peak into impact signals prolonged for a predetermined duration, a timing signal generator having an output, register means coupled to said timing signal generator, responsive to timing signals from its output, and having an input stage and an output stage, and means which in dependency upon whether a stored summation value supplied to inputs thereof from said output stage is or is not supplemented by an impact signal supplied to another of its inputs from said quantizing echo converter increases by a number of units the stored summation value or reduces such by a unit and which upon exceeding a predetermined minimum summation value produces a target presence signal on at least one of its outputs and upon subsequent dropping below such minimum summation value resets the stored summation value to the starting value null, said means being a fixed programmed read only memory which in accordance with a predetermined assignment table for each possible total condition combinations at its said inputs generates a respective predetermined total condition combination at its output, a partial combination at this output being coupled to said input stage of said register means as sole input to said register means other than that from said timing signal generator.

2. The accumulator radar echo detector as defined in claim 1, further including an evaluation device, wherein said register means is a shift register for delivering each partial condition combination supplied to its input stage from the output of said read only memory, under the action of periodically infed shift signals from said timing signal generator over a predetermined multiplicity of shift stages as a previously attained summation value to the input of said read only memory, and wherein via an additional input terminal of said read only memory the quantized impact signals from said quantizing echo signal converter are infed for the possible supplementing of the previous summation value and from the total condition combination appearing at the output of the read only memory there is transmitted a partial combination to the input of said shift register and the remaining combination to said evaluation device.

* * * * *